US010575388B2

(12) United States Patent
Shepherd

(10) Patent No.: US 10,575,388 B2

(45) Date of Patent: Feb. 25, 2020

(54) DIGITAL ADDRESSABLE LIGHTING INTERFACE CONFIGURATION

(71) Applicant: Eaton Intelligent Power Limited, Dublin (IE)

(72) Inventor: Stephen John Shepherd, Epsom (GB)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/249,766

(22) Filed: Jan. 16, 2019

(65) Prior Publication Data

US 2019/0150253 A1 May 16, 2019

Related U.S. Application Data

(62) Division of application No. 14/954,660, filed on Nov. 30, 2015.

(51) Int. Cl.

*H05B 37/02* (2006.01)
*G06F 3/0481* (2013.01)
*H05B 35/00* (2006.01)

(52) U.S. Cl.

CPC ..... *H05B 37/0272* (2013.01); *G06F 3/04817* (2013.01); *H05B 35/00* (2013.01); *H05B 37/0254* (2013.01); *Y02B 20/48* (2013.01)

(58) Field of Classification Search

CPC ..... H05B 37/0272; H05B 37/0254; H05B 35/00; Y02B 20/48

See application file for complete search history.

(56) References Cited

U.S. PATENT DOCUMENTS 6,493,340 B1 12/2002 Kawanaka
7,307,542 B1 * 12/2007 Chandler ........... H05B 37/0254 340/12.31
8,729,834 B1 5/2014 Funderburk (Continued)

FOREIGN PATENT DOCUMENTS

WO WO 2015104248 A1 7/2015

OTHER PUBLICATIONS

Pharos Architectural Control Limited, Pharos Designer User Manual, Jun. 22, 2009, v1.6, p. 47-54 (Year: 2009).*

(Continued)

*Primary Examiner* — Raymond R Chai

(74) *Attorney, Agent, or Firm* — King & Spalding LLP

(57) ABSTRACT

A method of configuring and managing a DALI network includes displaying rows of cells on a display of a mobile device. The cells are associated with addresses on DALI networks. The method further includes selecting, by the mobile device, a DALI controller, where DALI controller is connected to a DALI network. The method also includes detecting, by the DALI controller, DALI devices that are on the DALI network, where the DALI devices are controlled by the DALI controller. The DALI controller is configured to detect the DALI devices in response to a request from the mobile device. The method further includes displaying, within some or all cells in the row of cells displayed on the display of the mobile device, icons representing the DALI devices, where each cell having an icon displayed therein is associated with an address of a respective DALI device on the DALI network.

12 Claims, 14 Drawing Sheets

(56) References Cited

U.S. PATENT DOCUMENTS

2006/0028212 A1* 2/2006 Steiner ................. H05B 37/029
324/527
2008/0092075 A1* 4/2008 Jacob ................. H05B 37/0254
715/771
2011/0107248 A1 5/2011 Blum
2012/0133303 A1* 5/2012 Campbell ............... H04W 4/33
315/312
2012/0212140 A1 8/2012 Kim
2012/0299509 A1* 11/2012 Lee ..................... H04L 41/0806
315/291
2012/0306621 A1* 12/2012 Muthu ............... H05B 37/0272
340/8.1
2014/0070706 A1 3/2014 Fushimi
2014/0265863 A1* 9/2014 Gajurel .................. H05B 37/02
315/131
2015/0173160 A1 6/2015 Shira
2015/0220428 A1 8/2015 Simonyi et al.
2015/0223308 A1 8/2015 Yen
2016/0029457 A1 1/2016 Sung
2016/0088708 A1 3/2016 Anthony
2016/0381767 A1* 12/2016 Tiberi ................. G06F 3/04817
715/736
2017/0150585 A1* 5/2017 Gajurel .................. H05B 37/02

OTHER PUBLICATIONS

Great Britain Search Report for GB 1619737.8 dated May 22, 2017.
Samir Patel, EiC 2800 Search Report, dated Dec. 27, 2016, STIC.
Pharos Architectural Control Limited, Pharos Designer User Manual, Jun. 22, 2009, v.1.6, p. 47-54.

* cited by examiner

DIGITAL ADDRESSABLE LIGHTING INTERFACE CONFIGURATION

CROSS REFERENCE TO RELATED APPLICATIONS

The present application is a divisional application of and claims priority to U.S. Nonprovisional patent application Ser. No. 14/954,660, filed Nov. 30, 2015 and titled "Digital Addressable Lighting Interface Configuration," the entire content of which is incorporated herein by reference.

TECHNICAL FIELD

The present disclosure relates generally to control of devices including lighting fixtures and more particularly to provisioning, configuring and operating a Digital Addressable Lighting Interface (DALI) network system.

BACKGROUND

A Digital Addressable Lighting Interface (DALI) network system typically includes a number of lighting fixtures and other devices (collectively referred to herein as DALI devices) that are attached to a network. A control device (i.e., a DALI controller) that is also attached to the network may control a number of DALI devices. For example, a single DALI controller may control sixty four DALI devices. In some cases, DALI devices controlled by a DALI controller may be on different DALI loops. In some cases, multiple DALI controllers may be employed to control a larger number of DALI devices.

A DALI controller typically assigns addresses to the DALI devices that are installed on the DALI network. Provisioning, configuring and operating the DALI devices on the DALI network may be a time consuming and costly processes. For example, identifying individual DALI devices or groups of DALI devices based on addresses assigned by the DALI controller may be time consuming, particularly when a large number of DALI devices are installed on the DALI network and/or when the DALI controller assigns the addresses independently of user control.

Thus, methods that facilitate provisioning, configuration and operation including identification of installed individual DALI devices and groups of DALI devices are desirable.

BRIEF DESCRIPTION OF THE DRAWINGS

Reference will now be made to the accompanying drawings, which are not necessarily drawn to scale, and wherein.

Figure 1:
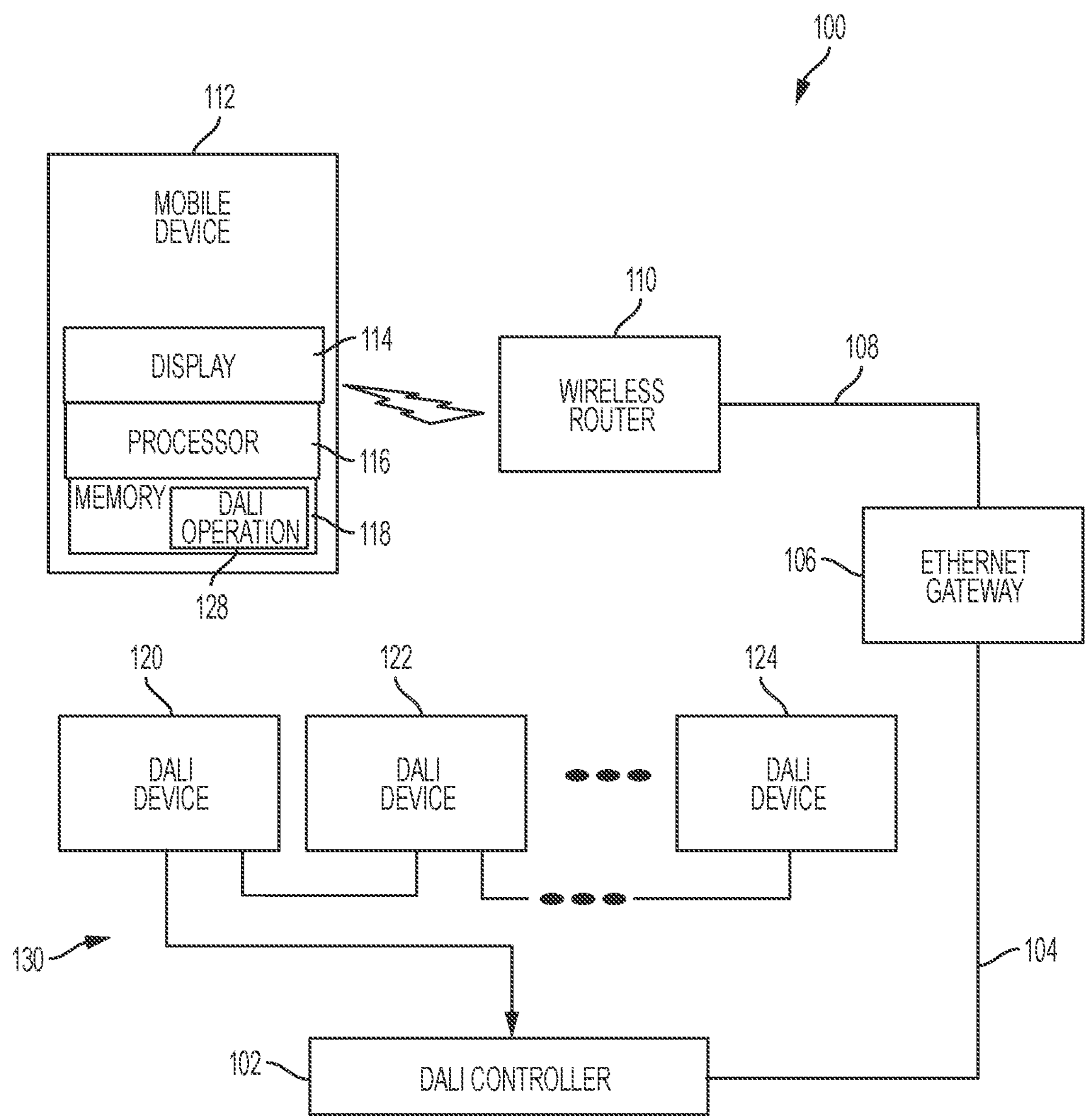
FIG. 1 illustrates a Digital Addressable Lighting Interface (DALI) control system including a DALI network and a mobile device according to one example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

SUMMARY

The present disclosure relates generally to control of devices including lighting fixtures and more particularly provisioning, configuring and operating a Digital Addressable Lighting Interface (DALI) network system. In an example embodiment, a method of configuring and managing a Digital Addressable Lighting Interface ("DALI") network includes displaying rows of cells on a display of a mobile device. The cells are associated with addresses on DALI networks. The method further includes selecting, by the mobile device, a DALI controller, where DALI controller is connected to a DALI network. The method also includes detecting, by the DALI controller, DALI devices that are on the DALI network, where the DALI devices are controlled by the DALI controller. The DALI controller is configured to detect the DALI devices in response to a request from the mobile device. The method further includes displaying, within some or all cells in the row of cells displayed on the display of the mobile device, icons representing the DALI devices, where each cell having an icon displayed therein is associated with an address of a respective DALI device on the DALI network.

In another example embodiment, a method of configuring and managing a DALI network includes displaying a grid view of cells on a display of a mobile device, wherein the cells are displayed in a grid pattern. The method further includes selecting, by the mobile device, a DALI controller, wherein the DALI controller is connected to a DALI network. The method also includes detecting, by the DALI controller, DALI devices that are on the DALI network, wherein the DALI devices are controlled by the DALI controller and wherein the DALI controller is configured to detect the DALI devices in response to a request from the mobile device. The method further includes importing a floor plan of an area into the mobile device, wherein the DALI devices are located in the area. The method also includes displaying, within some or all of the cells displayed on the display of the mobile device, icons representing the DALI devices, wherein each cell having an icon displayed therein is associated with an address of a respective DALI device on the DALI network.

In another example embodiment, a computer program product for configuring and managing a Digital Addressable Lighting Interface ("DALI") network, the computer program product stored in a nontransitory tangible computer readable medium and comprising instructions that, when executed, display rows of cells on a display of a mobile device, where the rows of cells are displayed in a grid pattern, The instructions, when executed, also detect DALI devices that are on a DALI network, wherein the DALI devices are controlled by a DALI controller. The instructions, when executed, also display, within some or all of the cells of the row of cells, icons representing the DALI devices, where each cell having an icon displayed therein is associated with an address of a respective DALI device on the DALI network.

These and other aspects, objects, features, and embodiments will be apparent from the following description and the appended claims.

DETAILED DESCRIPTION OF THE EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the drawings, FIG. 1 illustrates a Digital Addressable Lighting Interface (DALI) control system 100 including a DALI network and a mobile device according to one example embodiment. Referring to FIG. 1, the system 100 includes a DALI controller 102, multiple DALI devices 120, 122, 124, and an Ethernet gateway 106 communicably coupled to a wireless router 110. As shown in FIG. 1, the system 100 further includes a mobile device 112 that may be used, for example, to configure and/or commission the DALI devices 120-124 and the overall DALI network. The DALI controller 102 is communicably coupled to the DALI devices 120-124 via a network 130. The DALI controller 102 is communicably coupled to the Ethernet gateway 106 via a connection 104. For example, the DALI controller 102 may communicate with other devices such as the mobile device 112 through the Ethernet gateway 106.

The Ethernet gateway 106 is coupled to the wireless router 110 via a connected 108. For example, the wireless router 110 may be a Wi-Fi compatible router. Alternatively or in addition, the wireless router 110 may be compatible with other wireless standards without departing from the scope of this disclosure. In some example embodiments, the Ethernet gateway 106 and the wireless router 110 may be integrated into a single device. In some alternative embodiments, the system 100 may include a gateway other than an Ethernet gateway without departing from the scope of this disclosure.

In some example embodiments, the DALI controller 102 may be an SCMD6400, SCMD4, or another type of DALI controller as may be contemplated by those of ordinary skill in the art with the benefit of this disclosure. For example, the DALI controller 102 may support a single DALI loop or multiple DALI loops where some of the DALI devices 120-124 are on one DALI loop while others are on other DALI loops. The DALI controller 102 controls the DALI devices 120-124 using control signals and/or messages transmitted via a network 130. In some example embodiments, each DALI device 120-124 may be a fluorescent lighting fixture, a light emitting diode (LED) lighting fixture, an incandescent lighting fixture, a low voltage halogen lighting fixture, an emergency lighting fixture, a keypad (e.g., a Light Ineo keypad), a relay (e.g., a Light Ineo relay), a motion sensor, or another DALI compatible device as may be contemplated by those of ordinary skill in the art with the benefit of this disclosure. In some example embodiments, each of the DALI devices 120-124 can be independently coupled to a power source such that power is provided to the DALI devices 120-124 independent of the network 130.

In some example embodiments, the DALI controller 102 controls and monitors each DALI device 120-124 via the network 130 using unique addresses assigned to each DALI device 120-124. In one example embodiment, the unique addresses may be assigned by the DALI controller 102 during initialization or configuration of the system 100. For example, during the initialization or configuration of the system 100, each DALI device 120-124 may be assigned an individual address uniquely identifying the particular DALI device 120, 122, or 124. In some example embodiments, some or all of the DALI devices 120-124 may be assigned a group address on top of an individual address. For example, the DALI devices 120, 122 may be assigned the same group address such that the DA. A DALI controller 102 can communicate with both DALI devices 120, 122 using a common address such that each of the DALI devices 120-124 may be controlled by the DALI controller 102 with reference to the particular DALI device's unique individual or group address.

In some example embodiments, each DALI device 120-124 may be assigned an individual address in a range from 0 to 63. As such, the lighting network 130 may include up to sixty-four DALI devices such as the DALI devices 120-124 that are individually addressable by the DALI controller 102. In some example embodiments, fewer than sixty-four DALI devices may also be coupled to the lighting network 130. The DALI controller 102 and the DALI devices 120-124 may be connected as shown in FIG. 1 or in other topologies without departing from the scope of this disclosure. In some example embodiments, one or more of the DALI device 120, 122, or 124 may be a lighting fixture that includes a ballast where the ballast controls the operation (i.e., "on" or "off" or output power) of the DALI device 120, 122, or 124. For example, the DALI device 120 may be a fluorescent lighting fixture. Wires of the DALI network 130 may be connected to the ballast of the DALI device 120.

As illustrated in FIG. 1, the mobile device 112 may include a display 114, a processor 116, and a memory device 118. In some example embodiments, the mobile device 112 may be a smart phone or a tablet. For example, the mobile device 112 may be an IOS or Android device. The mobile device 112 may communicate with the DALI controller 102 via a wireless connection with the wireless router 110. In some example embodiments, the display 114 of the mobile device 112 may be a touch-sensitive display that is sensitive to a touch using, for example, a finger of a person and/or a stylus. The processor 116 may include multiple processors or controllers. Among other functions, the processor 116 may process user inputs provided, for example, via the display or by other means such as a keypad or a cursor. The processor 116 may also function to establish network connections from/to the mobile device 112.

In some example embodiments, the memory device 118 may include a random access memory (RAM) such as a static RAM, a dynamic RAM, and other kinds of memory such as read only memory (ROM) and a flash memory. For example, the memory device 118 may store a computer program product for configuring and managing DALI network, where the computer program product includes instructions that are executable, for example, by the processor 116. In general, the memory device 118 may store programs, modules, data structures, and other elements that may be used in the operation of the mobile device 112 including receiving inputs, generating outputs, etc. In particular, a DALI operation section 128 of the memory device 118 may include software code executable by the processor 116 and other hardware of the mobile device to perform, in conjunction with other software and hardware of the mobile device, operations and functions implemented by the mobile device 112.

Figure 2:
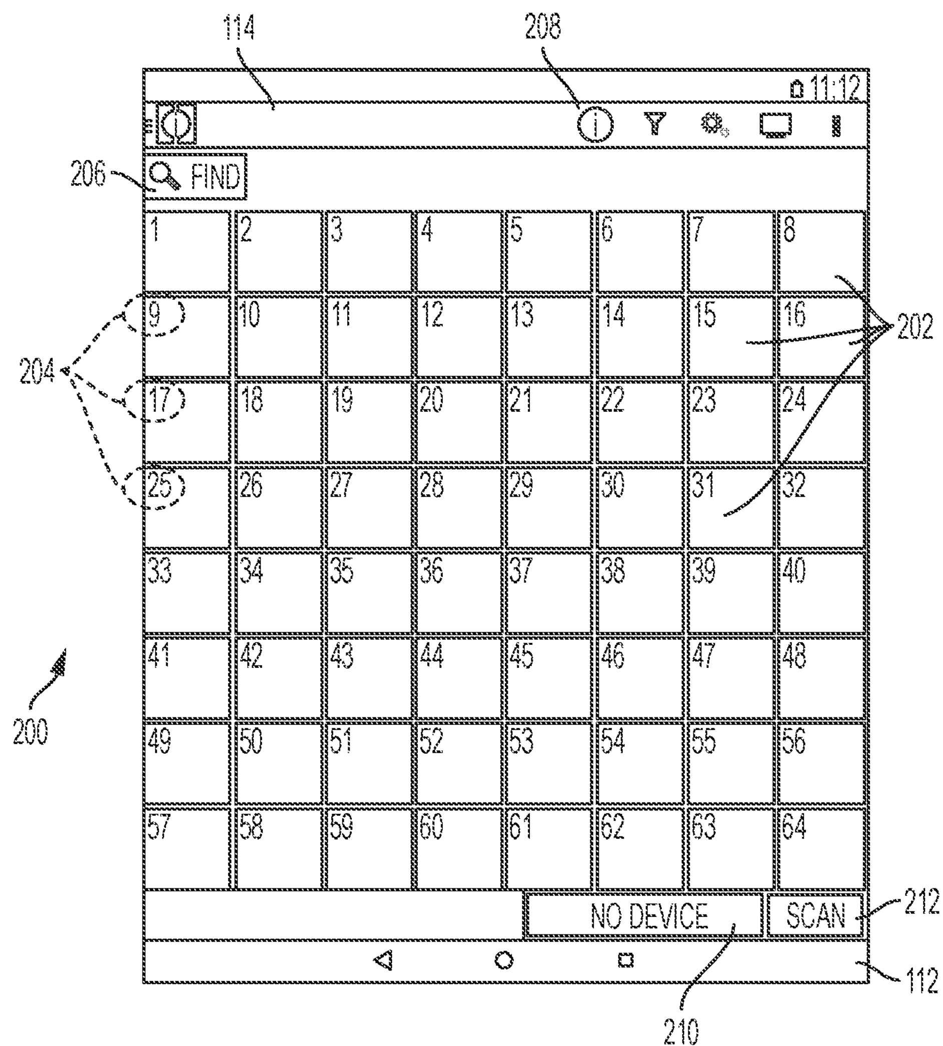
FIG. 2 illustrates a grid view displayed on the display of the mobile device 112 according to an example embodiment.

In some example embodiments, the mobile device 112 may be used to commission, configure, and/or manage the DALI devices 120-124. To illustrate, the mobile device 112 may provide a grid view of DALI devices on the display 114. An example of the grid view displayed on the display 114 of the mobile device 112 is shown in FIG. 2. For example, by communicating with the DALI controller 102, the mobile device 112 may be used to assign as well as change addresses of the DALI devices 120-124, for example, during an initialization process as well as to resolve address conflicts. The mobile device 112 may also be used to group as well as to regroup the DALI devices 120-124 by communicating with the DALI controller 102. The mobile device 112 may also be used to identify individual or multiple DALI devices 120-124 by causing, for example, the DALI devices 120-124 to flash a light.

In some example embodiments, the mobile device 112 may also be used to associate DALI devices 120-124 with a floor plan that includes the DALI devices 120-124 such that the DALI devices 120-124 shown on the floor plan are updated with the assigned addresses of the DALI devices 120-124. In some example embodiments, the mobile device 112 may also be used to diagnose and display DALI device failures such as lamp failures.

The DALI device 112 may facilitate initialization, commissioning and configuration of the DALI devices 120-124 as well as the overall DALI network 130 and thereby save time and reduce cost. For example, determining particular locations of DALI devices 120-124 may be time consuming if, for example, the DALI controller 102 assigns the individual addresses of the DALI devices 120-124 randomly or the address assignment information is outdate or unavailable. Further, grouping and regrouping of the DALI devices 120-124 may be time consuming, if the addresses of the DALI devices 120-124 are unknown at installation.

Although three DALI devices 120-124 are shown in FIG. 1, as can be understood from the drawing, the system 100 as well as the DALI network 130 may include more than three DALI devices. For example, the system 100 may include 64 DALI devices. In some alternative embodiments, the system 100 may include fewer or more than 64 DALI devices without departing from the scope of this disclosure. In some alternative embodiments, the system 100 may have a topology other than shown in FIG. 1. For example, in some alternative embodiments, the system 100 may not include an Ethernet.

FIG. 2 illustrates a grid view 200 displayed on the display 114 of the mobile device 112 according to an example embodiment. Referring to FIGS. 1 and 2, a DALI network configuration application that includes instructions executable by the processor 116 and residing on the memory device 118 may cause the display of the grid view 200 shown in FIG. 2. As illustrated in FIG. 2, in the grid view 200, cells 202 are displayed in a grid pattern. For example, rows of the cells 202 may be displayed such that the cells 202 are in columns. Each cell 202 may be associated with an address (also referred to as a DALI network address) on a DALI network such as the DALI network 130 of FIG. 1. To illustrate, a DALI network address 204 (shown surrounded by the dotted lines for illustrative purposes) may be displayed within each cell 202. For example, the grid view 200 may include sixty four cells 202 with a respective one of DALI network address from 1-64 displayed in each one of the sixty four cells 202. In some alternative embodiments, the DALI addresses displayed within the cells may range from 0-63. Although the DALI network addresses are shown on the top left corner of each cell 202, in alternative embodiments, the DALI network addresses may be displayed at a different location within each cell 202 without departing from the scope of this disclosure.

In some example embodiments, a find icon 206 may be displayed on the display 114 of the mobile device 112. For example, the grid view 200 shown in FIG. 2 is prior to the mobile device 112 establishing a connection with a particular DALI controller such as the DALI controller 102 of FIG. 1. By selecting the find icon 206, a user may begin a search of available DALI controllers. For example, a user may touch the find icon 206 using a finger on the display 114 to begin a search of DALI controllers by the mobile device 112.

In some example embodiments, a number of selectable icons and message indicators may be displayed in a display area 208. In a display area 210, information related detected DALI devices, such as the DALI devices 120-124, may also be displayed. In some example embodiments, a selectable area 212 of the display 114 may be provided to allow a user, for example, to manually initiate a search of DALI devices. For example, user may touch the selectable area 212 to manually initiate a search of DALI devices after the mobile device 112 is connected to a DALI controller that is communicably coupled to DALI devices. Although a particular configuration of the display areas 208, 210, 212 is shown in FIG. 2, in some alternative embodiments, display areas 208, 210, 212 may be in a different configuration. Further, the find icon 206 may be displayed at a different location on the display 114 than shown in FIG. 2.

Figure 3:
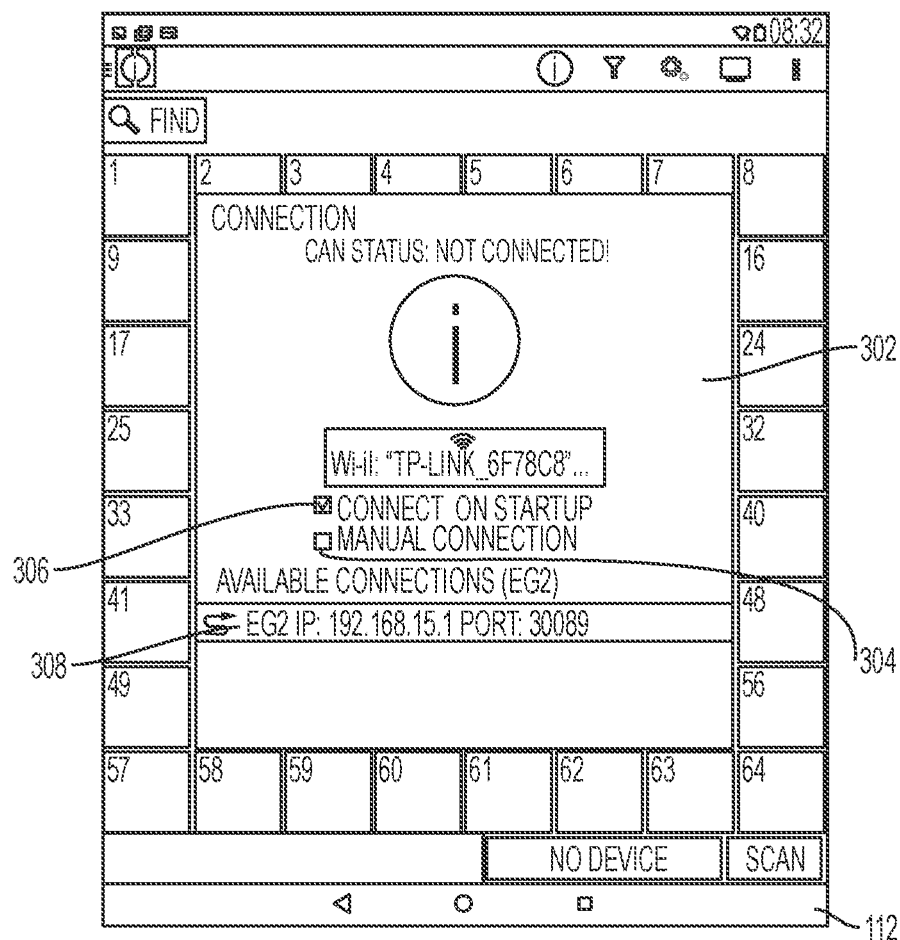
FIG. 3 illustrates a wireless connection screen displayed on the display of the mobile device 112 according to an example embodiment.

FIG. 3 illustrates a wireless connection screen 302 displayed on the display 114 of the mobile device 112 according to an example embodiment. As illustrated in FIG. 3, the mobile device 112 may be connected to a wireless network (e.g., a Wi-Fi network) by selecting a manual connection box 304. Alternatively, the mobile device 112 may be connected to a wireless network at the startup of the DALI network configuration application residing in the mobile device 112 by selecting a connect-at-startup box 306. To illustrate, the mobile device 112 may connect to the wireless router 110 based on the selection of the manual connection box 304 and the connect-at-startup box 306.

In some example embodiments, a list of available gateways such as the Ethernet gateway 106 may be displayed on the wireless connection screen 302. For example, internet protocol (IP) address of the gateway may be displayed. A user may select a gateway from the list of gateways by touching the desired gateway on the display 114. In some example embodiments, a gateway that broadcast a User Datagram Protocol (UDP) packet may be detected and displayed on the wireless connection screen 302. Although one gateway (EG2) is shown in FIG. 3, in some alternative embodiments, multiple available gateways may be displayed on the wireless connection screen 302.

Figure 4:
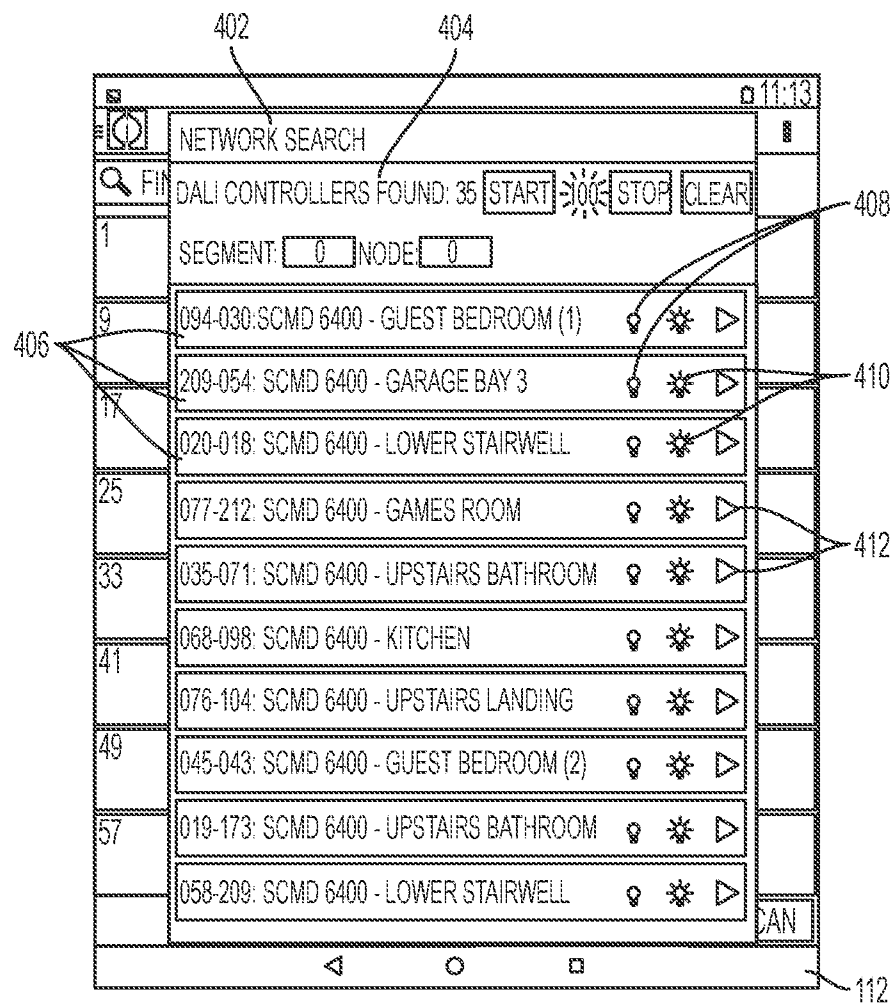
FIG. 4 illustrates a DALI controller selection screen displayed on the display of the mobile device according to an example embodiment.

FIG. 4 illustrates a DALI controller selection screen 402 displayed on the display 114 of the mobile device 112 according to an example embodiment. In some example embodiments, the DALI controller selection screen 402 includes a display area 404 for providing information regarding the number of DALI controllers that are found by performing a network search. For example, after the wireless device 112 is connected to the wireless router 110 and detected one or more DALI controllers such the DALI controller 102 of FIG. 1, a user may initiate the DALI controller selection screen 402 by selecting the find icon 206 shown in FIG. 2. In some example embodiments, the user may touch a start icon in the display area 404 of the display 114 to start the search for DALI controllers. The number of DALI controllers found may be displayed, for example, in the display area 404 during and after the search for the DALI controllers.

In some example embodiments, some or all of the DALI controllers 406 that are found are displayed on the display 114. Along with the device id (e.g., segment and node), type and name of the DALI controllers, an off icon 408, an on icon 410, and an arrow icon 412 may be displayed. One or more of the DALI controllers 406 may be renamed by the mobile device user. In some example embodiments, touching the on icon 410 associated with a particular DALI controller 406 may cause DALI devices (e.g., light fixtures with ballasts or drivers) that are communicably coupled to the particular DALI controller 406 to emit a light to allow a user (e.g., a technician) to identify the DALI devices controlled by the particular DALI controller 406. The user may also select/touch the off icon 408 to stop the DALI devices from emitting the light. A user may select a particular DALI controller 406 by selecting/touching the arrow icon 412 associated with the particular DALI controller 406. Upon the selection of one of the DALI controller 406, the DALI universe of the particular DALI controller 406 may be searched and read.

In some example embodiments, the DALI devices 406 that are displayed on the DALI controller selection screen 402 may be only SCMD6400 and compatible DALI controllers such as SCMD4. Alternatively in addition, other types of DALI controllers may be displayed on the DALI controller selection screen 402. Although a particular arrangement of the DALI controllers and icons is shown in FIG. 4, in some alternative embodiments, the DALI controllers and icons may be displayed in a different arrangement without departing from the scope of this disclosure.

Figure 5:
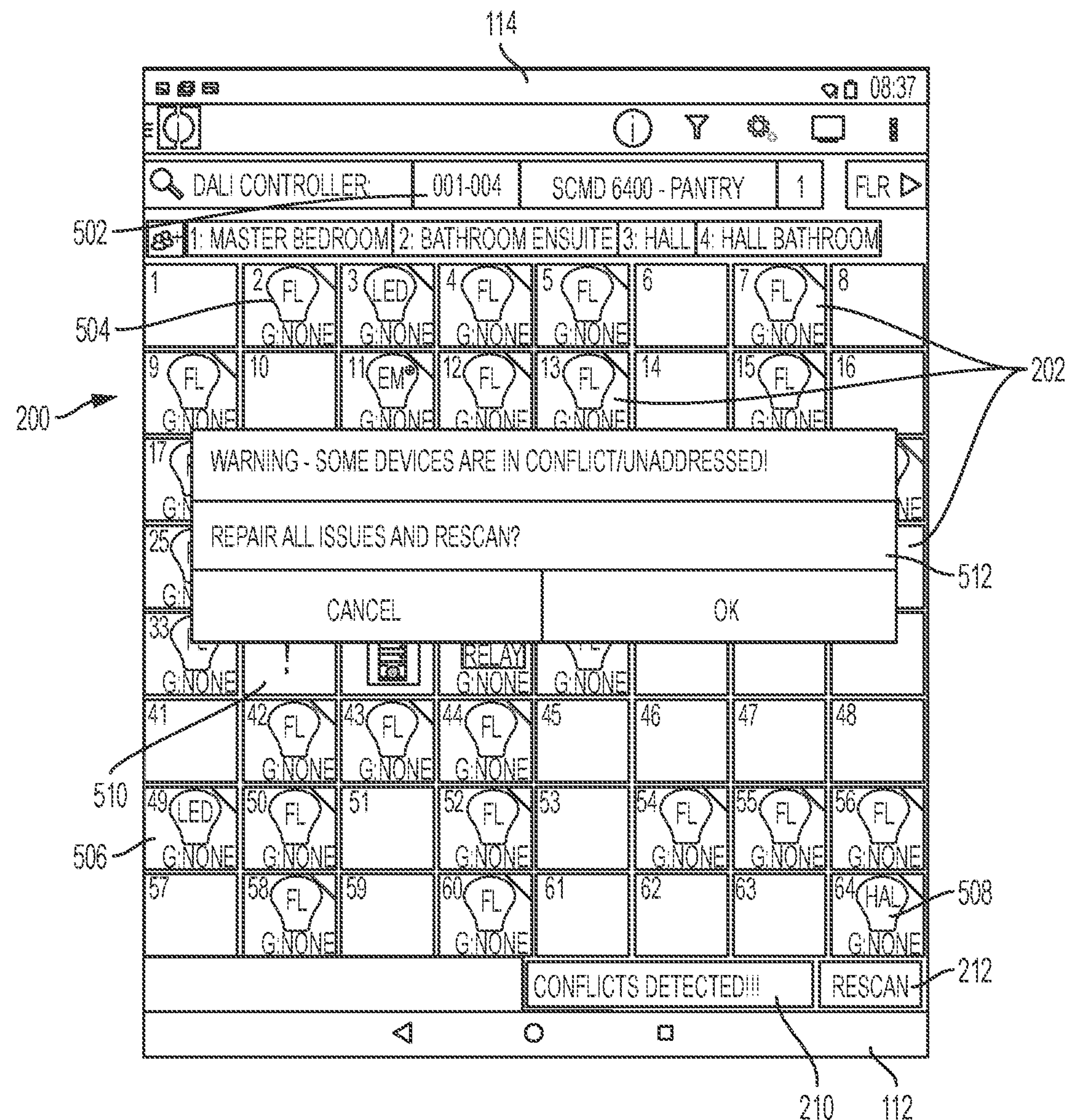
FIG. 5 illustrates the grid view with cells populated with DALI device icons according to an example embodiment.

FIG. 5 illustrates the grid view 200 with cells populated with DALI device icons according to an example embodiment. Upon a selection of a DALI controller as described above with respect to FIG. 4, the mobile device 112 may perform a search of DALI devices that are communicable coupled to the selected DALI controller. To illustrate with respect to FIGS. 1 and 5, the mobile device 112 may initiate a search of the DALI devices that are coupled to the DALI controller 102 upon a selection of the DALI controller 102 by a user as described with respect to FIG. 4. For example, information identifying the selected DALI controller 130 of FIG. 1 may be displayed in a display area 502, and search for the DALI devices 120-124, which at this stage are unknown to the mobile device 112, may be performed.

As shown in FIG. 5, some of the cells 202 are populated with icons of DALI devices while other cells 202 are not populated with the icons. To illustrate, a cell 504 of the cells 202 may be populated with an icon representing a fluorescent lighting fixture, and a cell 506 of the cells 202 may be populated with an icon representing an LED lighting fixture. A cell 508 of the cells 202 may be populated with an icon representing an incandescent lighting fixture.

To illustrate, a DALI device that has a DALI network address "2" is represented by the icon displayed in the cell 504 that is associated with DALI network address "2" as illustrated by the display of "2" in the cell 504. As another example, a DALI device that has a DALI network address "19" is represented by the icon displayed in the cell 506 that is associated with DALI network address "19" as illustrated by the display of "19" in the cell 506.

In some example embodiments, some of the cells 202 may be associated with a DALI network address that has been assigned to more than one DALI devices. Conflicts may be indicated by displaying an icon (e.g., an exclamation mark) within cells that are associated with DALI network addresses that have conflicts. For example, an exclamation mark is shown in a cell 510 to show that two or more DALI devices have been assigned the same DALI network address associated with the cell 510.

In some example embodiments, the search of the DALI devices that are communicably coupled to a selected DALI controller may discover DALI devices that have not been assigned a DALI network address. For example, the DALI device 124 of FIG. 1 may be connected to the DALI network 130 without having been assigned an address.

Upon detection of DALI devices with conflicted addresses as well as unaddressed DALI devices, a dialog screen 512 may appear on the display 114 of the mobile device 112. In some example embodiments, a user may choose to cancel initiate automatic repair operations to resolve conflicts and assign addresses to unaddressed DALI devices by touching the display 114 over the "ok" displayed in the dialog screen 512. The dialog screen 512 may be dismissed by the user by touching the display 114 over the "Cancel" displayed in the dialog screen 512. In some alternative embodiments, the resolution of address conflicts and the addressing of unaddressed DALI drivers may be initiated by other means without departing from the scope of this disclosure.

In some example embodiments, the detection of address conflicts may also be conveyed in the display area 210. Rescanning of the DALI network (e.g., the DALI network 130 of FIG. 1) for devices connected to the selected DALI controller may be performed by the mobile device 112 by a user selecting (e.g., touching) the selectable area 212.

Although a particular arrangement of display areas and icons is shown in FIG. 5, in some alternative embodiments, other arrangements may be displayed. Although particular icons are shown in FIG. 5, other icons may be used without departing from the scope of this disclosure.

Figure 6:
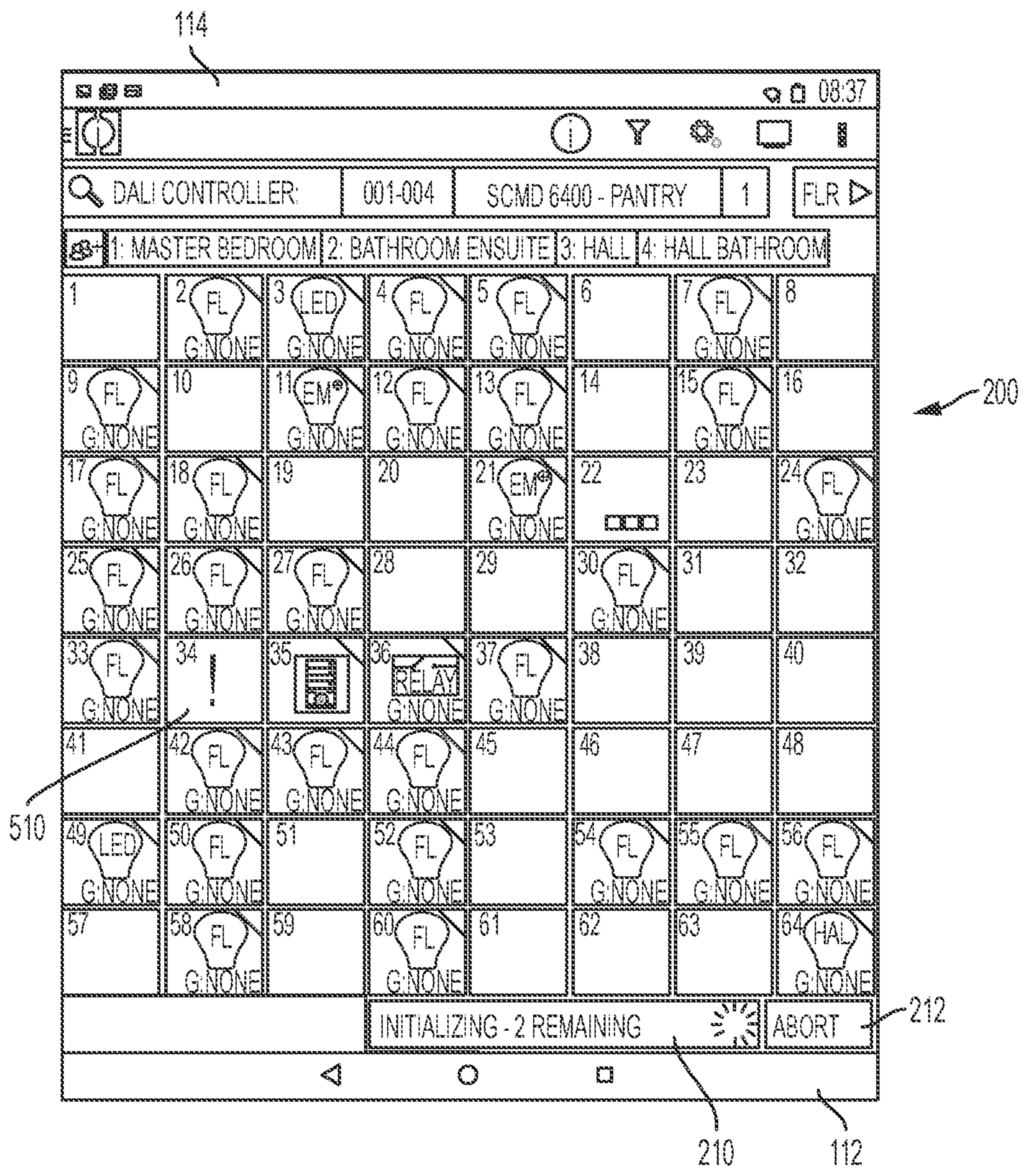
FIG. 6 illustrates the grid view of cells during a process to resolve DALI network address conflict according to an example embodiment.

FIG. 6 illustrates the grid view 200 of cells during a process to resolve DALI network address conflict according to an example embodiment. As illustrated in FIG. 6, information indicating the status of conflicting address resolution and assigning of addresses to unaddressed DALI devices is shown in the display area 210. As described above, in some example embodiments, the process may be initiated using the dialog screen 512 shown in FIG. 5. The process may also be aborted by touching the selectable area 212.

As illustrated in FIG. 6, the cell 510 is still showing an exclamation mark icon indicative on unresolved address conflict at this stage of the process. Upon a successful address conflict resolution, the exclamation mark icon in the cell 510 would be removed and may be replaced with an icon of a DALI device that is assigned with the address "34" with which the cell 510 is associated.

Figure 7:
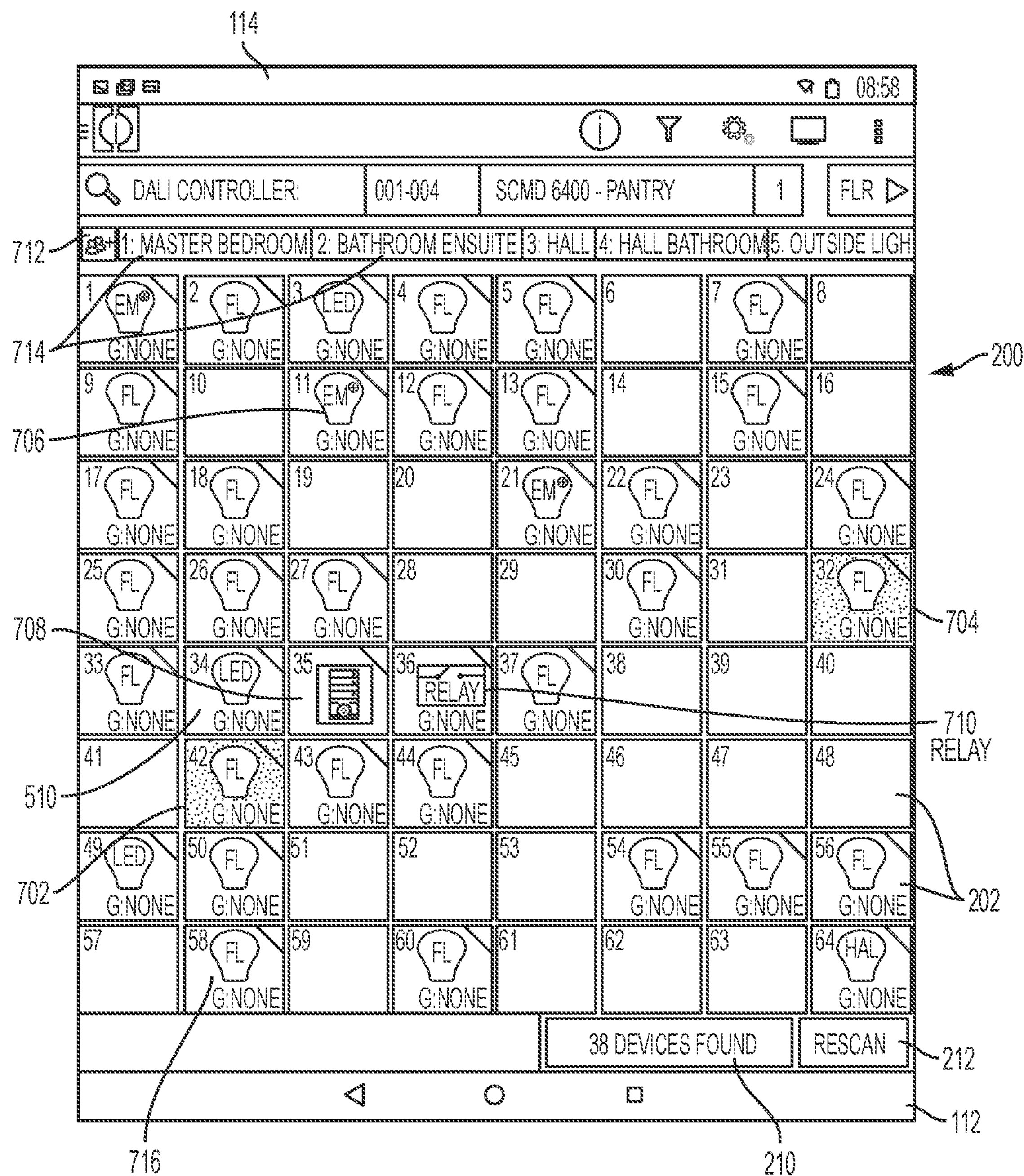
FIG. 7 illustrates the grid view of cells after resolution of DALI network address conflicts according to an example embodiment.

FIG. 7 illustrates the grid view 200 of cells after resolution of DALI network address conflicts according to an example embodiment. As illustrated in FIG. 7, information indicating the number of DALI devices found is shown in the display area 210. In some example embodiments, a user may request rescanning of a DALI network such as the DALI network 130 of FIG. 1 for DALI devices by selecting (e.g., touching with a fingertip) the selectable area 212. Because address conflicts are resolved, the exclamation mark icon that was present in the cell 510, as shown in FIG. 6, has been replaced with an icon representing the DALI device that has the DALI network address "34". In some example embodiments, a list of all DALI devices that have been discovered may be displayed on the display 114. The list can also be exported.

As illustrated in FIG. 7, some of the cells 202 of the grid view 200 may be associated with DALI devices that are defective. For example, lamp failures or other defects of DALI devices may be indicated in some of the cells 202. To illustrate, the cell 702 may be associated with a DALI device (e.g., a luminaire) that has a DALI network address "42", and the cell 704 may be associated with a DALI device that has a DALI network address "32". For example, the DALI devices associated with the cells 702, 704 may have, for example, defective lamps. To indicate such defects (or other defects of the DALI devices), a particular color shading may be displayed within the cells 702, 704. Alternatively, a failure icon or another means may be used to indicate that the cells 702, 704 are associated with DALI devices that have defective elements.

In some example embodiments, different types of DALI devices may be represented by different icons. For example, an emergency light fixture may be represented by the icon shown in the cell 706. As another example, the keypad may be represented by the icon shown in the cell 708. As yet another example, a relay may be represented by the icon shown in the cell 710. In some alternative embodiments, other icons or other means of representing the DALI devices that are associated with the respective cells 202 may be displayed in the cells 202 without departing from the scope of this disclosure. In some alternative embodiments, a single icon or other means may be used to represent different types of DALI devices.

In some example embodiments, a DALI device (e.g., the DALI device 120 of FIG. 1) may be identified by causing the DALI device to emit a flashing light. Using the cell 716 as an example, tapping the cell 716 with a fingertip may result in the DALI device with the DALI network address "58" to emit a flashing light, which may allow the user to identify the physical DALI device. The user may stop the flashing light by tapping the cell 716.

In some example embodiments, a group icon 712 may be used to display group names of DALI groups of DALI devices. For example, a list of DALI groups may be displayed on a separate display area overlapping the cells 202 upon a user selecting (e.g., touching with a fingertip) the group icon 712. In some example embodiments, some of the DALI groups 714 that have been configured may be displayed on the display 114. In some example embodiments, if a DALI device that is associated with one of the cells 202 is assigned into a DALI group, the name of the DALI group may be displayed within the particular cell 202.

In some example embodiments, selecting (e.g., touching with a fingertip) one of the groups 714 displayed on the display 114 may grey out all DALI devices in the grid view 200 that are not in the selected DALI group to more clearly illustrate cells associated with DALI devices belong to the selected DALI group. For example, touching the Bathroom Ensuite DALI group 714 may grey out particular cells 202 and icons displayed therein that are not associated with DALI devices that have been grouped in the Bathroom Ensuite DALI group 714.

In some example embodiments, a DALI device associated with a particular cell 202 may be regrouped (i.e., placed in a different group) by touching the particular cell (e.g., touching the icon displayed in the particular cell 202) followed by touching the intended DALI group 714.

Figure 8:
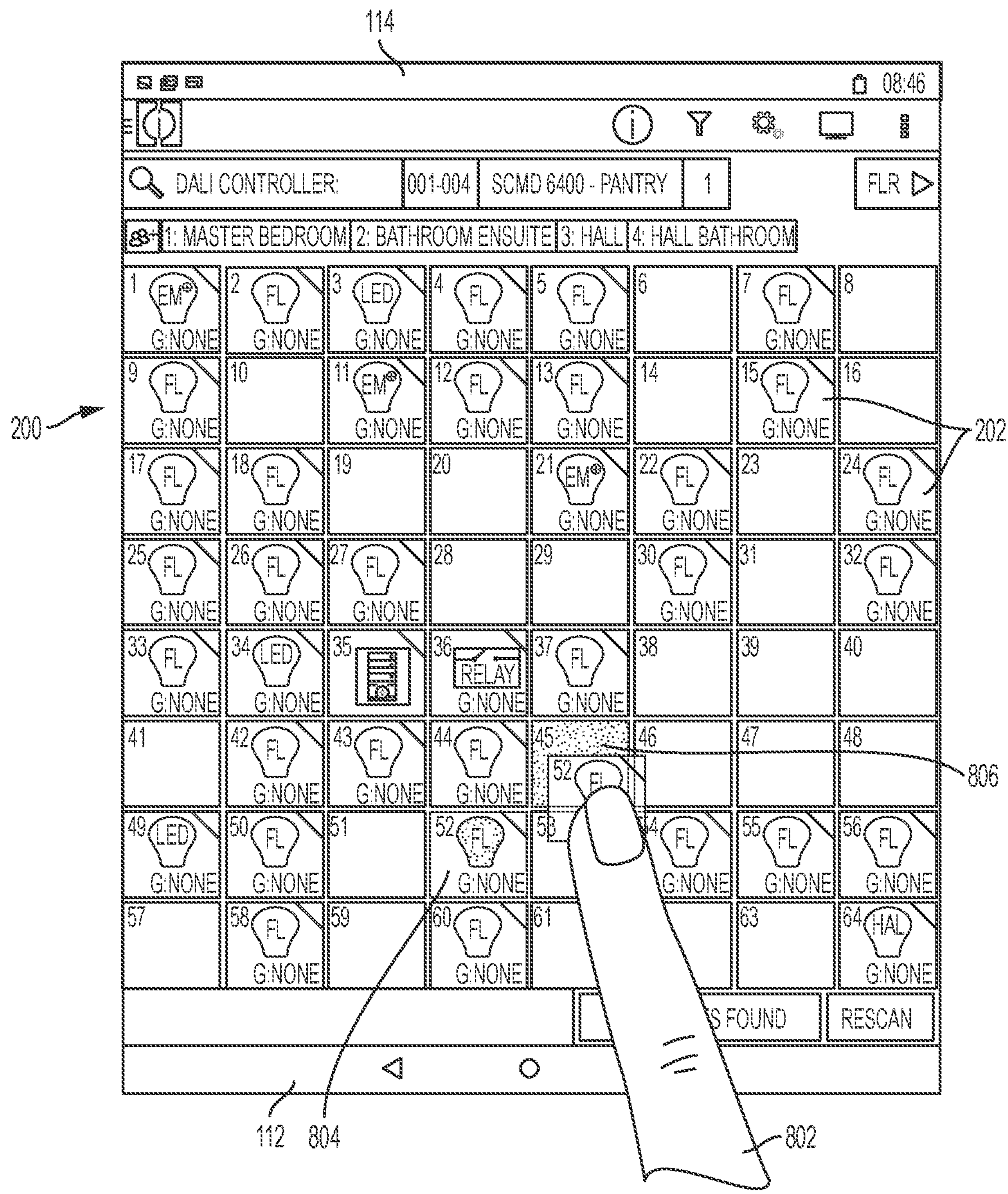
FIGS. 8 and 9 illustrate a process of changing a DALI network address of a DALI device using the grid view displayed on the mobile device according to an example embodiment.

FIG. 8 illustrates a process of changing a DALI network address of a DALI device using the grid view 200 displayed on the mobile device 112 according to an example embodiment. In some example embodiments, an address of a DALI device, such as the DALI devices 120-124 of FIG. 1, may be changed by dragging and dropping the icon representing the DALI device from one cell of the cells 202 to another one of the cells 202. To illustrate with respect to example cells 802, 804, the DALI network address of a DALI device may be changed from the "52" to "45" by a user touching the cell 804 (e.g., touching the icon displayed in the cell 804) and dragging it to and dropping it at the cell 806, for example, using the user's finger 802.

Figure 9:
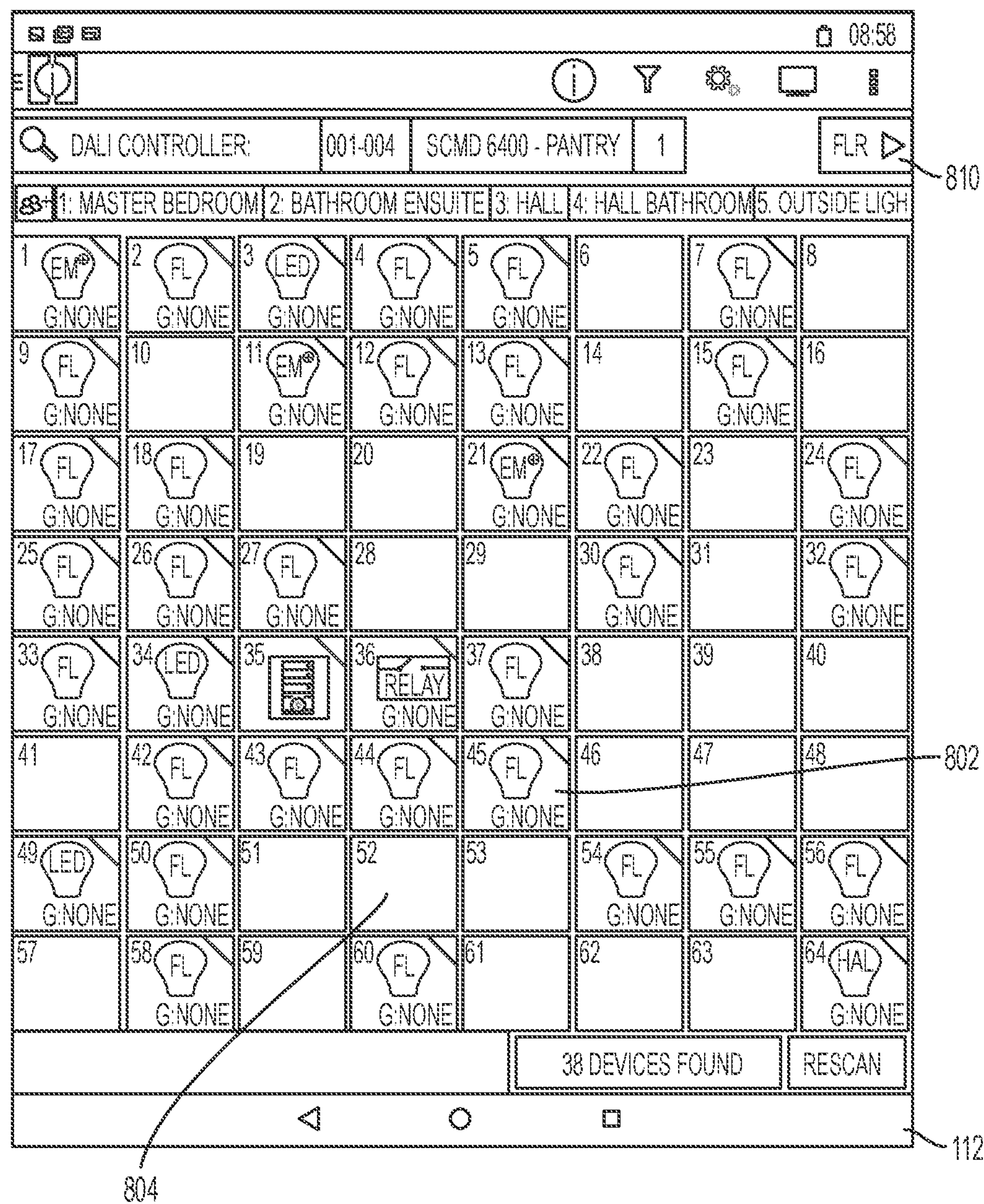

Upon the completion of the drag and drop process, the icon that was previously displayed in the cell 804 appears in the destination cell 806, which indicates that the DALI device that previous had the address "52" now has the address "45". If the destination cell 806 is unassociated with a DALI device prior to the address change, the source cell 804 will no longer have an icon displayed therein as illustrated in FIG. 9. If the destination cell 806 is associated with a DALI device prior to the address change, the DALI device that was previous assigned the address "45" may now have the address "52" and an icon representing the particular DALI device may now be displayed in the cell 804. Address changes performed as described above are saved in the DALI controller (e.g., the DALI controller 130 of FIG. 1) controlling the DALI devices (e.g., the DALI devices 120-124 of FIG. 1). Indeed, operations and configurations of the DALI devices including address changes and grouping/regrouping that performed by a user using the mobile device 112 are performed through the DALI controller.

In some example embodiments, a floor-plan view icon 810 may be displayed on the display 114 to allow a user to select a floor-plan view in cases where a floor plan file has been imported into the mobile device 112. To illustrate, a user may invoke the floor-plan view by selecting (e.g., touching) the floor-plan icon 810. Upon selection of the floor-plan icon 810, the grid view 200 displayed on the display 114, for example, as shown in FIGS. 8 and 9 may be replaced with a floor-plan view illustrated in FIG. 10.

Figure 10:
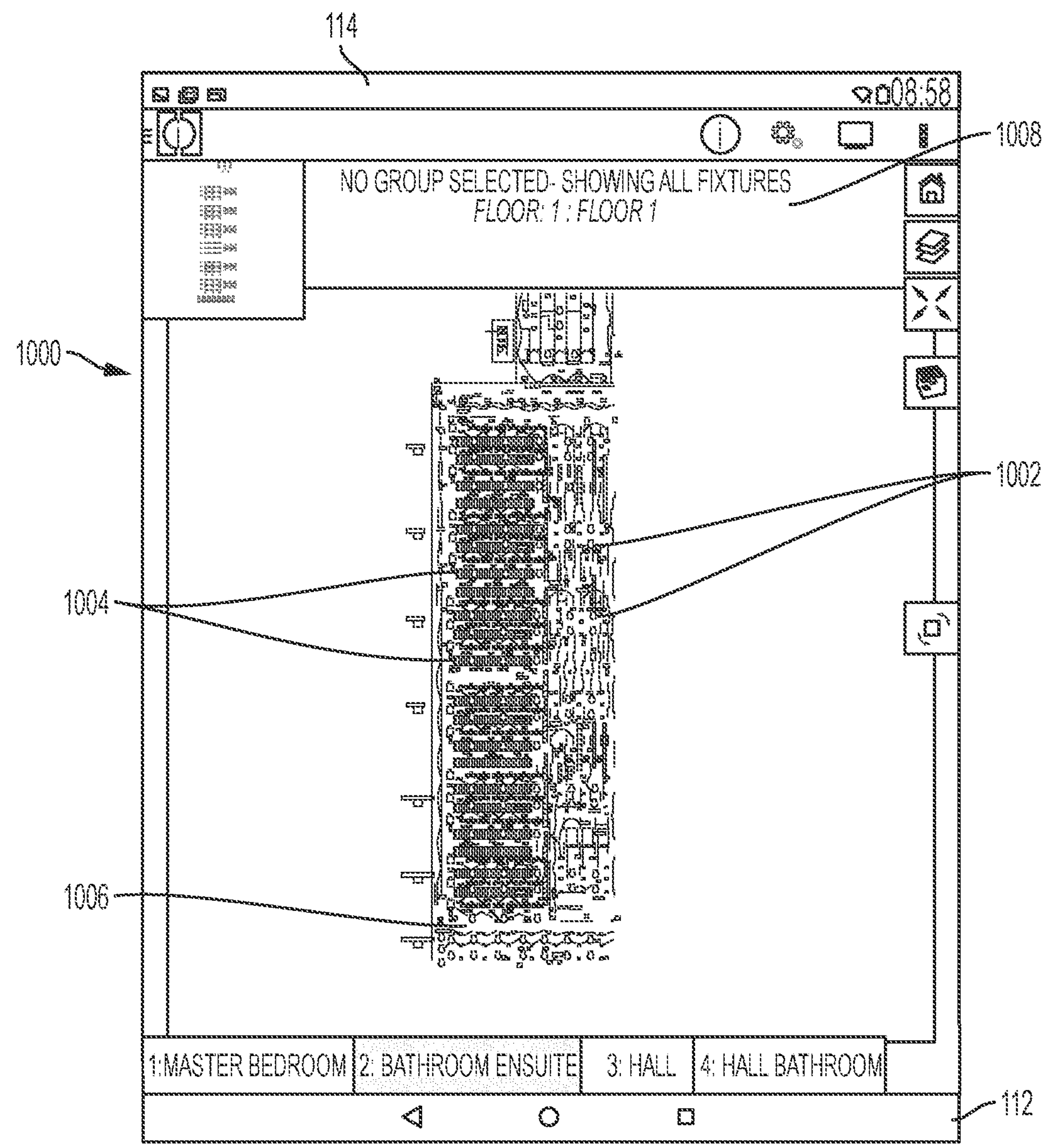
FIG. 10 illustrates a floor-plan view showing a floor layout including locations of DALI devices displayed on the display of the mobile device according to an example embodiment.

FIG. 10 illustrates a floor-plan view 1000 showing a floor layout including locations of DALI devices displayed on the display 114 of the mobile device 112 according to an example embodiment. In some example embodiments, the floor-plan view 1000 is displayed based on a floor plan file imported into the mobile device 112. For example, the imported floor plan file may be in an XML format that may be processed by the mobile device 112 to generate the floor-plan view 1000 shown in FIG. 10.

As illustrated in FIG. 10, the DALI devices 1002, other floor layout structures (e.g., walls) 1004, and isles 1006 may be shown in the floor-plan view 1000. To illustrate, the DALI devices 1002 may be lighting fixtures such as fluorescent and LED lighting fixtures that are located on a floor of a building.

Figure 11:
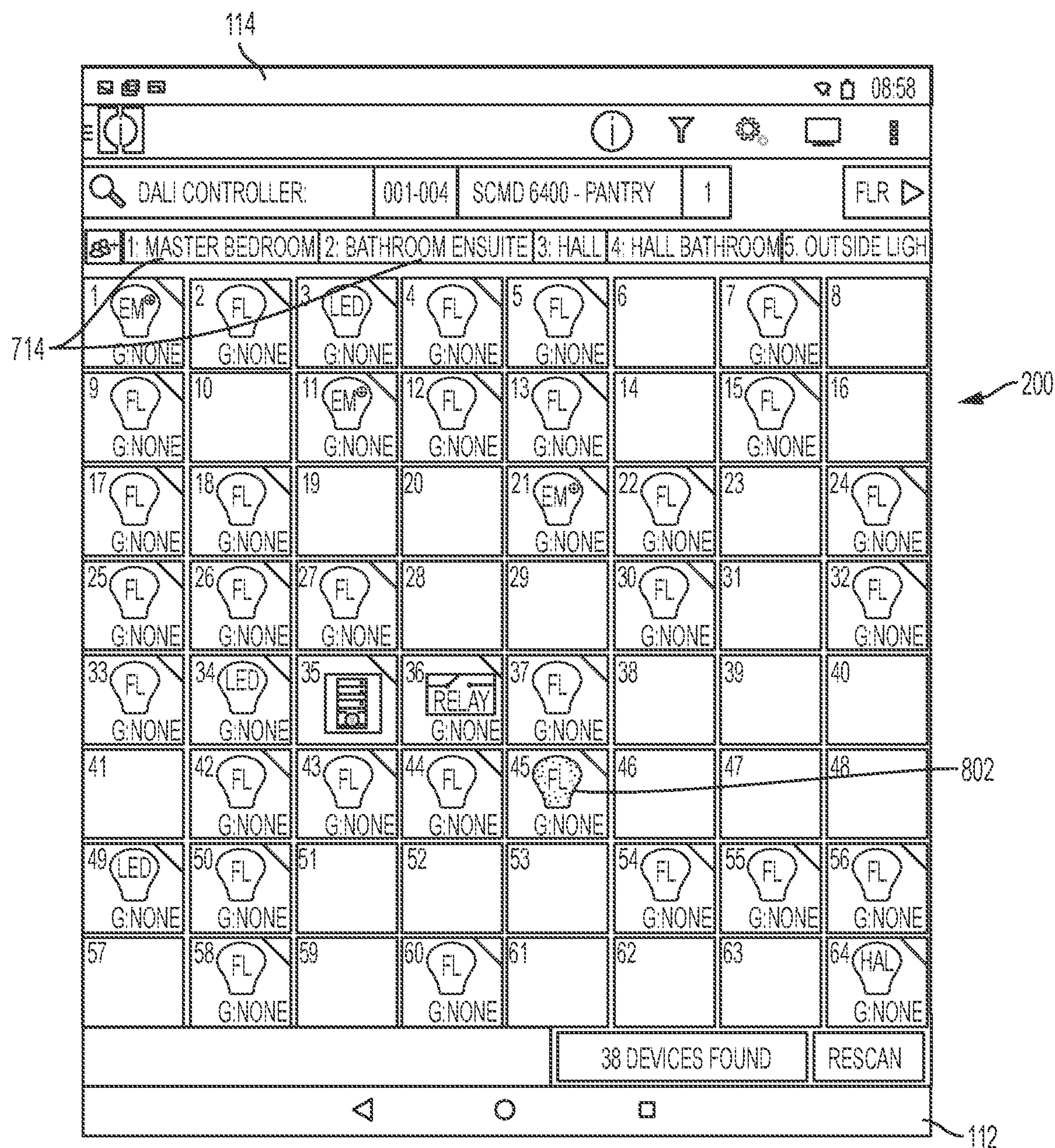
FIGS. 11-13 illustrate steps of grouping a DALI device and updating the floor plan file according to an example embodiment.
Figure 12:
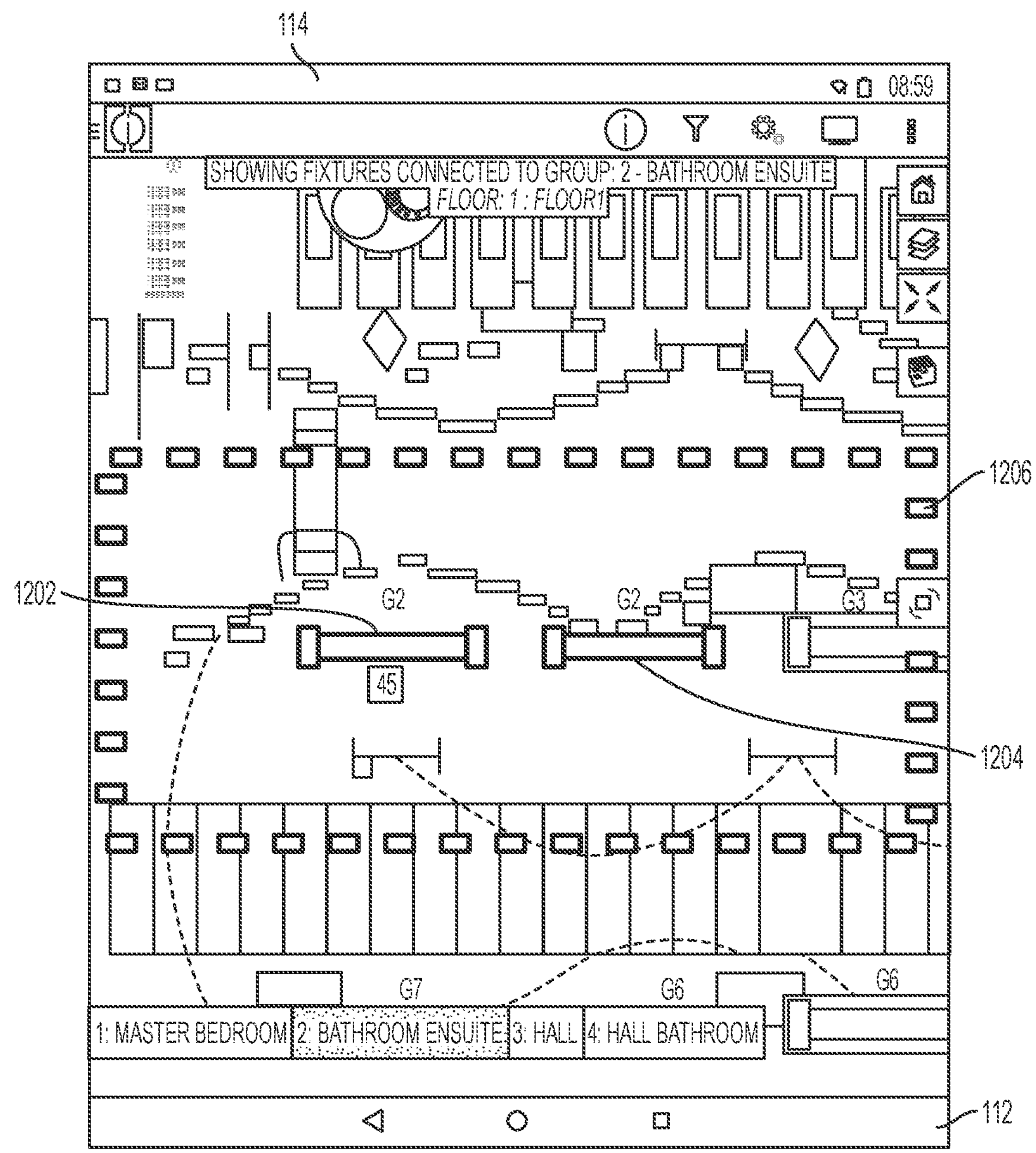
Figure 13:
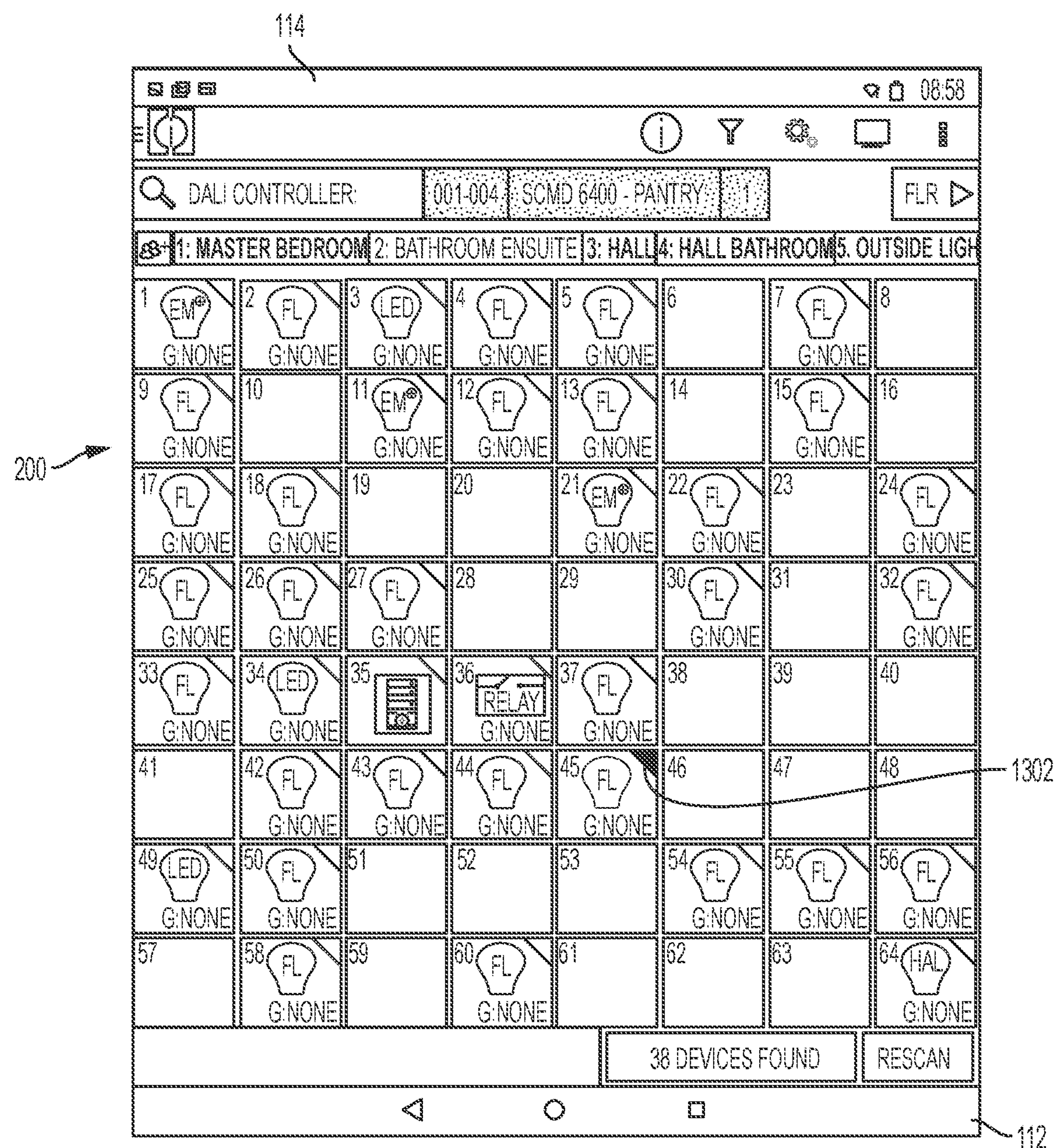

FIGS. 11-13 illustrate steps of grouping a DALI device and updating the floor plan file according to an example embodiment. To illustrate with respect to the cell 802 associated with a DALI device having an address "45", a user may select (e.g., by touching the icon displayed with the cell 802 for a duration) such that the mobile device 112 displays the icon in the cell 802 as shaded (e.g., shaded in a particular color such as in blue). After the icon displayed within the cell 802 is shaded by the mobile device 112 in response to the user input, the user may select (e.g., touch) the particular DALI group 714 (e.g., the Bathroom Ensuite) displayed on the display 114, which results in the grouping/regrouping of the DALI device having the address "45" in the particular DALI group 714 (e.g., the Bathroom Ensuite). Upon a successful grouping/regrouping of the DALI device, the mobile device 112 may execute instructions, for example, stored in the memory device 118 shown in FIG. 1 to switch to the floor plan view as shown in FIG. 12.

As shown in FIG. 12, the floor plan view displayed on the display 114 shows DALI devices that are in the particular DALI group (e.g., the Bathroom Ensuite) in which the DALI device having the address "45" was placed. For example, DALI devices 1202, 1204 that are intended be in group 2 (e.g., the Bathroom Ensuite) according to the floor plan file imported into the mobile device 112 may be highlighted and shown within a dotted box 1206. Selecting the DALI device 1202, for example by touching the display 114 over the highlighted DALI device 1202, would assign the DALI address "45" to the DALI device providing an accurate mapping between floor plan view (as well as the floor plan file that may be exported from the mobile device after the update) and the DALI network addresses assigned to the DALI devices.

Upon returning to the grid view shown in FIG. 13, the cell 802 may have a rectangular tag display at a corner of the cell 802 and the DALI device icon displayed therein may be faded for clarity to allow the user to focus on other DALI devices. If no floor plan file has been imported into the mobile device 112, the floor plan display shown in FIG. 12 is not provided.

Figure 14:
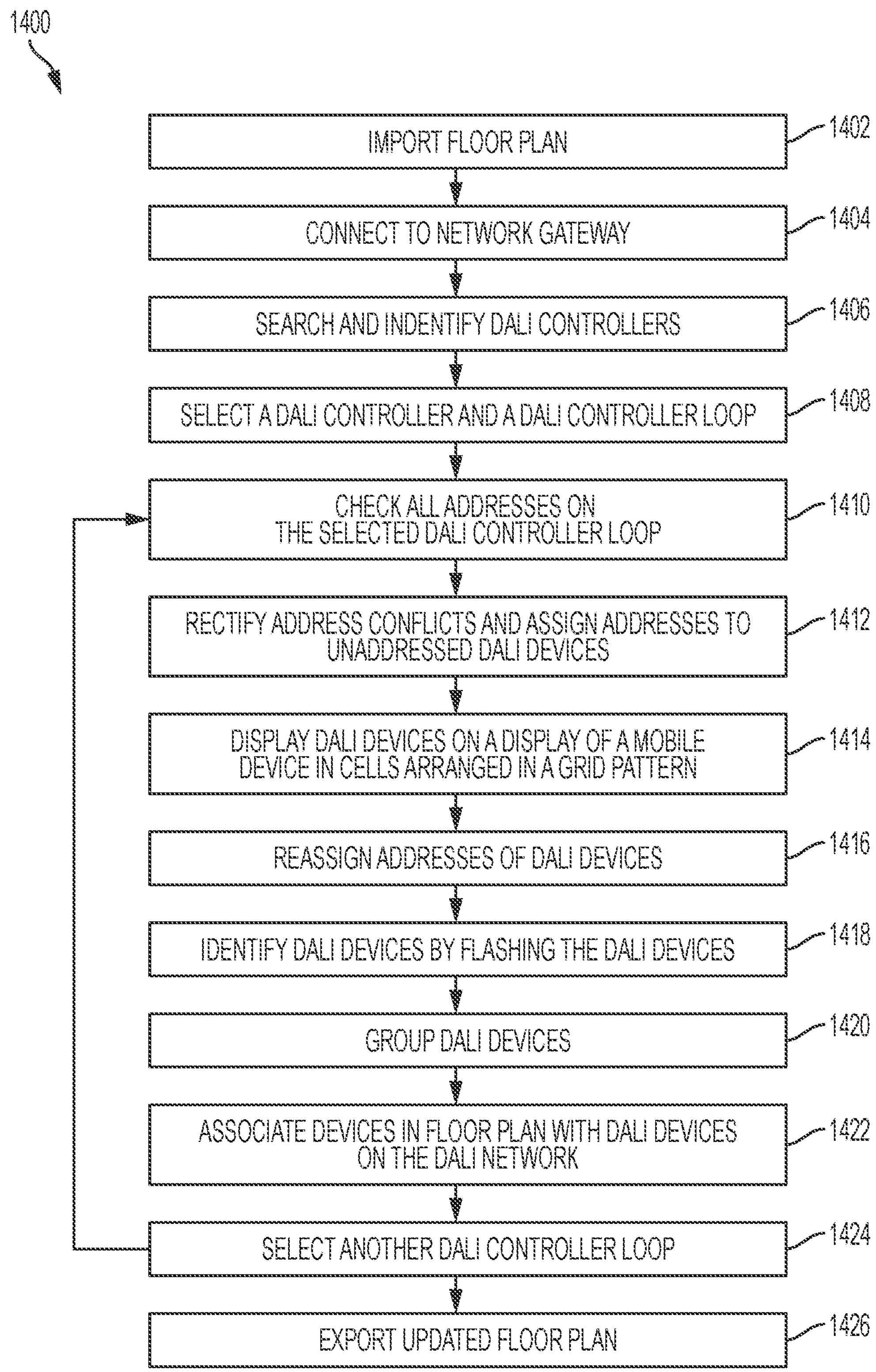
FIG. 14 illustrates a flowchart of a method for the operation of the system of FIG. 1 according to one example embodiment.

FIG. 14 illustrates a flowchart of a method 1400 for the operation of the system 100 of FIG. 1 according to one example embodiment. Referring to FIGS. 1-14, the method 1400 may include importing a floor plan file (e.g., an XML format file) into the mobile device 112 at step 1402. For example, a user may download the floor plan file from a website accessed by the mobile device 112 or from a computer that is connected to the mobile device 112 via a cable. The floor plan may include floor layout and other information related to associated DALI devices such the DALI devices 120-124. At step 1404, the method 1400 may include connecting to a network gateway such as the Ethernet gateway 106, for example, as described with respect to FIG. 3. To illustrate, the mobile device 112 may detect UDP packets transmitted by gateways to identify the gateways. For example, the mobile device 112 may execute code stored in the memory device 118 to detect UDP packets and to identify and connect to a particular gateway such as the Ethernet gateway 106. In some example embodiments, the mobile device 112 may connect to a particular gateway in response to a user selecting the gateway from a list of gateways displayed on the display 114 by the mobile device 112.

At step 1406, the method 1400 may include searching and identifying DALI controllers, such as the DALI controller 102 of FIG. 1, that are available. For example, the mobile device 112 may execute code in response to a user input, as described with respect to FIGS. 2 and 4, to search and identify DALI controllers that are connected to the Ethernet gateway 106. To illustrate, DALI controllers, such as the DALI controller 102, may be discovered/identified by sending a "Node Status" message on a CAN network. Sending the Node Status message allows filtering controllers by type (e.g., SCMD6400 DALI Controller) and by their unique identification numbers ("Segment" and "Node"). All controllers matching the criteria return a CAN message with their operational status, thus enabling the mobile device 112 to enumerate all relevant devices on the display 114.

To illustrate, "0" is treated as a wildcard number. For example, the mobile device 112 can search for all controllers on the network by sending a Node Status message where "segment" is 0 and "node" is 0. Alternatively, specific controllers can be searched for by their segment/node identifiers. In some example embodiments, for a wildcard search (i.e., segment and node are both 0), all DALI controllers will respond within a given period (e.g., approximately 10 seconds). Once the time period is over and all DALI controllers are enumerated, the mobile device may then request the name, serial number and firmware version of each DALI controller. The mobile device 112 may execute code stored therein to provide full network (e.g., CAN) message monitoring, translation and filtering of network (e.g., CAN) activity and system events. Once the DALI controllers have been identified and displayed on the display 114 of the mobile device 112, the DALI controllers may be renumbered (segment and node) and renamed by a user.

At step 1408, the method 1400 may include selecting a DALI controller and a DALI controller loop, if multiple DALI controller loops are supported by the selected DALI controller. For example, a user may select the DALI controller 102 from a list of one or more DALI controllers found in step 1406. The mobile device 112 may execute code stored in the DALI operation 128 to process the user's input provided via the display 114 and to select the DALI controller/loop chosen by the user for further interactions and operations.

At step 1410, the method 1400 may include checking (e.g., pinging), through the interaction of the mobile device 112 and the DALI controller 102, all addresses on the DALI network 130 of the selected DALI controller 102 and/or the selected DALI controller loop of the DALI controller 102. To illustrate, the mobile device 112 may execute code in the DALI operation 128 to send a message, via the Ethernet gateway 106, to the DALI controller 102 to ping all network addresses (e.g., 64 addresses) on the DALI network 130 or on the selected DALI controller loop. The DALI controller 102 may check the addresses and send a message to the mobile device 112, via the Ethernet gateway 106, providing the result.

For example, the DALI controller 102 may provide to the mobile device 112 information on DALI devices (e.g., the DALI device 120-124) that are on the DALI network 130, an address that has been assigned to multiple DALI devices, etc. The mobile device 112 may execute software code to process the message from the DALI controller 102 and provide information extracted from the message on the display 114 of the mobile device 112. By performing step 1410, information about the DALI universe of the DALI controller 130 or the selected DALI loop may be gathered and displayed for a user (e.g., a technician). For example, information about DALI network address conflicts and unassigned DALI devices that are connected to the DALI network of the selected DALI controller may be displayed by the mobile device 112 on the display 114 as described above.

At step 1412, the method 1400 may include rectifying address conflicts and assigning addresses to unaddressed DALI devices as described with respect to FIG. 5. For example, resolution of address conflicts and assignment of addresses to unassigned DALI devices may be performed in response to a user input provided by responding to a dialog screen displayed on the display 114 as described above. To illustrate, the DALI controller 102 allows its DALI universe (i.e., devices on the network 130) to be communicated with directly by the mobile device 112 by providing a "window" onto the DALI network 130. In some example embodiments, the DALI controller 102 essentially provides no additional functionality other than alert the mobile device 112 that a given address has a conflict (i.e., two or more DALI devices, such as the DALI devices 120-124, with the same address). The access to the DALI network 130 allows the mobile device 112 to communicate "natively" with the DALI universe using its entire command set (for example, as detailed in BS EN 60929:2004).

To illustrate, the DALI command set provides a query for detecting any DALI devices with "missing" short addresses. The mobile device 112 may deploy such a command first since any DALI devices straight from the factory generally have no short addresses assigned. In some example embodiments, the DALI command set provides an Initialize command with three modalities: Initialize all DALI devices (e.g., DALI devices 120-124); Initialize DALI devices with address; and Initialize DALI devices without short address. Thus, the mobile device 112 rectifies all conflicts by initializing all unaddressed DALI devices (if detected) and Initializing each address known to have more than one DALI devices assigned to it.

At step 1414, the method 1400 may include displaying DALI devices in the cells 202 that are arranged in a grid pattern as shown, for example, in FIG. 7. To illustrate, the mobile device 112 may execute software code in the DALI operation 128 or generally in the memory device 118 to display the cells in the grid pattern and to display icons representing the DALI devices, as shown, for example, in FIG. 7.

In some example embodiments, DALI devices, such as the DALI devices 120-124, may have addresses reassigned at step 1416, as described with respect to FIGS. 8 and 9. For example, a user may drag and drop a DALI device icon from a first cell 804 to a second cell 806 to change the address of the DALI device from the address associated with the first cell 804 to the address associated with the second cell 806. To illustrate, the mobile device 112 may execute software code to receive the user's input provided via the display 114 and process the input to effectuate the address change. The mobile device 112 may further execute software code stored in the DALI operation 128 to send a message, via the Ethernet gateway 106, to the DALI controller 102 indicating the address change resulting from the user input.

In some example embodiments, the method 1400 may include, at step 1418, identifying DALI devices by flashing the DALI devices as described with respect to FIG. 7. For example, a user may tap, on the display 114 of the mobile device 112, a cell 202 that has an icon of a DALI device displayed therein to cause the DALI device having the address associated with the cell 202 to emit a flashing light, which allows visual identification of the DALI device by the user. To illustrate, a user may tap the cell 202 using the user's index finger. The mobile device 112 may execute software code in the DALI operation 128 to process the user's input (provided via tapping the particular cell 202) and send a message to the DALI controller 102 to instruct the DALI device having the address associated with the cell 202 to emit a flashing light. The mobile device 112 may also execute software code in the DALI operation 128 to process the user's input (provided via a subsequent tapping of the particular cell 202) and send a message to the DALI controller 102 to instruct the DALI device having the address associated with the cell 202 to stop emitting the flashing light.

At step 1420, the method 1400 may include grouping DALI devices as described, for example, with respect to FIGS. 11-13. The mobile device 112 may receive and process the user input and send a message to the DALI controller 102 to effectuate the grouping. Further, the mobile device 112 may execute software code stored in the DALI operation 128 or otherwise in the memory 118 to process the user input and communicate with the DALI controller 102. To illustrate, after the grouping is performed based on the user input provided via the display 114 as described above, the DALI controller may communicate with the particular DALI device(s) using a group address.

The method 1400 may include, at step 1422, associating physical devices (e.g., light fixtures) identified in the floor plan imported into the mobile device 112 with addresses of DALI devices on the DALI network as described with respect to FIG. 11-13. The mobile device 112 may execute software code stored in the DALI operation 128 or otherwise in the memory 118 to invoke the floor-pan view as described with respect to FIGS. 11-13 and to process user input for associating the addresses with the DALI devices identified in the floor plan. If multiple DALI controller loops are supported by the DALI controller 130, the method 1400 may include, at step 1424, selecting, by a user, another DALI controller loop, for example, from a list displayed on the display 114 of the mobile device 112. At step 1426, the method 1400 may include exporting the updated floor plan file (e.g., in XML format).

Some of the steps 1402-1426 of the method 1400 may be performed in different order than shown in FIG. 14 without departing from the scope of this disclosure. Further, some of the steps such as the step 1402 may be skipped without departing from the scope of this disclosure. In general, the mobile device 112 communicates with the DALI controller 130 or a similar DALI controller to perform steps and operation that are require communicating with and managing the DALI devices 120-124 and other DALI devices that are controlled by the DALI controller 130. For example, to cause a DALI device (e.g., the DALI device 124) to emit a flashing light in response to a user touching a particular cell 202 associated with the address of the DALI device, the mobile device 112 sends a DALI message to the DALI driver which instructs the DALI device to perform the operation. In general, steps and operations described herein that are performed by the mobile device 112 may be performed based on a combination of hardware and software operations. Based on computer instructions that are executable by the mobile device to provide a grid view of cells that are associated with addresses of DALI devices on a DALI network and by communicating with DALI controllers based on user inputs through touch-sensitive display of the mobile device, the operation of mobile device is improved, resulting in efficient and improved ways configuring and managing DALI networks.

In general, the mobile device 112 communicates directly with the DALI universes of DALI controllers, using the standard DALI digital command set, for example, as detailed in BS EN 60929:2004, using the DALI controller as a portal. For example, communication with the DALI controller 102 may be accomplished over a CAN network using an Ethernet gateway 106. To illustrate, DALI controllers, such as SCMD6400, SCMD2 and SCMD4, that allow DALI commands to be sent directly to their DALI universes may be used as the DALI controller 102, thus allowing the DALI universe to be communicated with natively by the mobile device 112. In some example embodiments, the mobile device 112 may provide a filter view on the display 114 that allows a user to select whether DALI devices should be shown or hidden in the grid view (e.g., grid view 200 shown in FIG. 7) based on, for example, tagged status and/or DALI device type.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A method of configuring and managing a Digital Addressable Lighting Interface ("DALI") network, the method comprising:

displaying a grid view of cells on a display of a mobile device, wherein the cells are displayed in a grid pattern;

selecting, by the mobile device, a DALI controller, wherein the DALI controller is connected to a DALI network;

detecting, by the DALI controller, DALI devices that are on the DALI network, wherein the DALI devices are controlled by the DALI controller and wherein the DALI controller is configured to detect the DALI devices in response to a request from the mobile device;

importing a floor plan of an area into the mobile device, wherein the floor plan includes the DALI devices; and displaying, within some or all of the cells displayed on the display of the mobile device, icons representing the DALI devices, wherein each cell having an icon displayed therein is associated with an address of a respective DALI device on the DALI network;

displaying, by the mobile device, a portion of the floor plan, on the display of the mobile device; and associating, by the mobile device, an address corresponding to a cell in the grid view of the cells with a DALI device shown in the portion of the floor plan displayed on the display of the mobile device.

2. The method of claim 1, further comprising switching, by the mobile device, from displaying the grid view of the cells to displaying a floor-plan view, wherein the floor-plan view includes the floor plan of the area including the DALI devices located in the area.

3. The method of claim 2, wherein the mobile device is configured to display the floor plan on the display of the mobile device in response to a user input selecting the floor-plan view.

4. The method of claim 1, further comprising displaying a close-up view of the floor plan on the display of the mobile device, wherein the close-up view of the floor plan shows one or more DALI devices that belong to a first DALI group and wherein one or more DALI devices that belong to a second DALI group are excluded from the close-up view.

5. The method of claim 1, wherein the address corresponding to the cell is associated with the DALI device in response to a user input selecting the DALI device in the portion of the floor plan displayed on the display of the mobile device.

6. The method of claim 1, further comprising adding, by the DALI controller, a particular DALI device into a DALI group, wherein the particular DALI device is associated with the cell in the grid view of the cells.

7. The method of claim 6, wherein the particular DALI device is added into the DALI group in response to the DALI group and the cell in the grid view of the cells being selected.

8. The method of claim 6, wherein the portion of the floor plan is displayed on the display of the mobile device in response to the adding of the particular DALI device into the DALI group.

9. The method of claim 1, further comprising exporting, by the mobile device, an updated floor plan, wherein the updated floor plan indicates the association between the address corresponding to the cell in the grid view of the cells and the DALI device shown in the portion of the floor plan.

10. The method of claim 1, wherein the floor plan imported into the mobile device includes information related to the DALI devices.

11. The method of claim 1, further comprising providing to a user, by the mobile device, an option to select whether one or more icons representing one or more DALI devices are hidden from view in the grid view of the cells.

12. The method of claim 11, wherein the option includes a selection based on a type of the one or more DALI devices.

* * * * *